United States Patent [19]

Izumitani et al.

[11] Patent Number: 4,738,703

[45] Date of Patent: Apr. 19, 1988

[54] METHOD OF MOLDING OPTICAL LENSES

[76] Inventors: Tetsuro Izumitani, No. 685-58, Hodokubo, Tokyo; Shinichiro Hirota, No. 1-2-401, Mejirodai, Mejirodai, Hachioji-shi, Tokyo; Helmuth E. Meissner, No. 1-1-1, Kamisunacho, Tachikawa-shi, Tokyo; Kishio Sugawara, No. 1-31-23, Shinmeidai, Hamura-cho,, Nishitama-gun; Tokyo, all of Japan

[21] Appl. No.: 865,590

[22] Filed: May 21, 1986

Related U.S. Application Data

[63] Continuation of Ser. No. 673,024, Nov. 19, 1984, abandoned.

[30] Foreign Application Priority Data

Nov. 29, 1983 [JP]  Japan ................................. 58-223184

[51] Int. Cl.$^4$ ............................................. C03B 23/00
[52] U.S. Cl. ......................................... 65/64; 65/103; 65/104
[58] Field of Search ...................... 65/64, 66, 103, 104, 65/355; 264/1.1, 112

[56] References Cited

U.S. PATENT DOCUMENTS

| | | | |
|---|---|---|---|
| 4,046,545 | 9/1977 | Sanford et al. | 65/64 |
| 4,168,961 | 9/1979 | Blair | 65/66 |
| 4,391,622 | 7/1983 | Alting et al. | 65/66 |

FOREIGN PATENT DOCUMENTS 2525525  10/1983  France ................................. 264/1.1

OTHER PUBLICATIONS

Kingery et al., "Intro. to Ceramics", 2nd Edition, 1976, pp. 92–93.

*Primary Examiner*—S. Leon Bashore
*Assistant Examiner*—Michael K. Boyer

[57] ABSTRACT

Optical lenses high in configurational accuracy with smooth surfaces are press molded in a carefully finished, polished and properly dimensioned mold preferably in a non-oxidizing atmosphere. The molding operation includes placing a quantity of glass having an internal viscosity of at least about $10^6$ poises in such a mold while maintaining the mold at a temperature at least equal to the glass transition temperature and thereafter passing the glass into a lens of predetermined configuration at a pressure of at least 100 Kg/cm$^2$. Performing procedures are also disclosed.

1 Claim, 1 Drawing Sheet

METHOD OF MOLDING OPTICAL LENSES

This is a continuation of application Ser. No. 673,024, filed Nov. 19, 1984, which was abandoned upon the filing hereof.

BACKGROUND OF THE INVENTION

This invention relates to a method of manufacturing a press lens which, after completion of the manufacturing steps, is so high both in configuration accuracy and in surface roughness that it is unnecessary to polish the lens.

Glass lenses are manufactured according to previously known methods in which glass is melted or softened, put into a metal mold, and the glass in the mold is pressed to have an external form which is generally similar to or approximating the desired final external form of the lens desired. The pressed lens is then subjected to cold grinding and polishing to make a finished lens.

The art has also described a procedure for pressing a lens having optical mirror surfaces which needs no grinding and polishing steps during the manufacturing in which a mirror-finished mold, is used to form the lens by pressing the lens-forming material in a non-oxidizing atmosphere. Glasslike carbon is disclosed as a suitable material for fabricating the mold in the specification of Japanese Patent Application Laid-Open No. 11277/1972, SiC or $Si_3N_4$ are suggested as suitable mold materials in the specification of Japanese Patent Application Laid-Open No. 45613/1977, and a mixture of SiC and carbon are described as suitable mold materials in the specification of U.S. Pat. No. 4,168,961. It will be appreciated that if a lens can be manufactured in final form according to such a method, then the manufacturing cost can be greatly reduced and the processing time simplified because no grinding or polishing steps are required in the manufacturing process.

The following two methods of imparting an external form to a piece of glass which is substantially similar to the desired final external form are well known in the art. In the first method, molten glass having a viscosity of 10 to $10^3$ poises is caused to drop in the form of a gob from the outlet, and the glass thus dropped, which is received by a mold at a temperature lower than the glass transition temperature, is pressed with a pressure of 2 to 10 $kg/cm^2$. In this operation, the mold serves to shape the glass and to receive heat from the high temperature glass during pressing. The temperature of the mold is controlled and made lower than the glass transition temperature to prevent the mold from fusing with the glass. In this case, the pressing operation is stopped before the inside of the piece of glass thus formed is sufficiently solidified although the surface of the glass piece is cooled and solidified. Because of the difference in contraction between the cooled surface and the warmer inside of the glass piece, a so-called "shrink phenomenon" occurs with the piece of glass, and therefore the piece of glass thus formed is low in configuration accuracy. Indeed, if the pressing operation is carried out for a longer period of time at a low mold temperature, then the surface of the piece of glass is cooler than the inside thereof, and the piece of glass is easily cracked.

In the second method, a piece of glass stock such as a glass plate, a glass block or a glass bar, is cut to obtain a piece of glass having a predetermined volume dimensions, and the piece of glass thus obtained is coated with a release agent such as $Al_2O_3$ or BN. The piece of glass thus treated is put in an oven where it is softened to about $10^5$ poises and, thus softened, the piece of glass is quickly put in a mold and is pressed by a pressure of 5 to 50 $kg/cm^2$. In this method, the related agent sticks to the surface of the product, and therefore it is necessary to grind and polish the product. On the other hand, in the press lens forming method disclosed by Japanese Patent Application Laid-Open No. 11277/1972 and U.S. Pat. No. 4,046,545, mentioned above, a piece of glass is put in a mold and it is pressed while it is being heated together with the mold. While the piece of glass together with and retained in the mold is being cooled, the pressing operation is continued until the temperature of the piece of glass becomes lower than the glass transition temperature. However, in this method, the cycle time to make a single pressed lens is considerably long, and the glass must be kept in contact with the mold for the long cycle time, as a result of which the surface of the mold is liable to be roughened unless special glass or a special mold material is used.

BRIEF DESCRIPTION OF THE DRAWINGS

In FIGS. 2 and 3, $N_2$ gas is flowing out of the gaps in the molds, and all of the equipment is held in the atmosphere of $N_2$ gas.

DETAILED DESCRIPTION OF THE INVENTION

Figure 1:
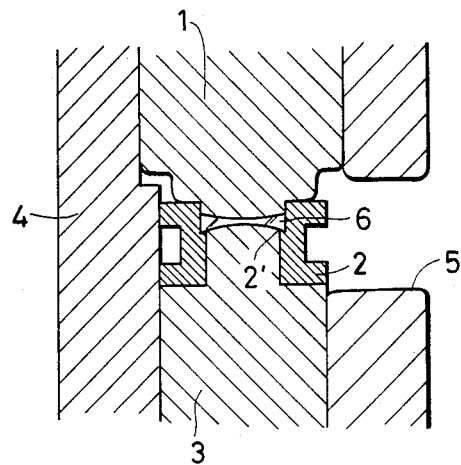
FIG. 1 is a sectional view of a mold which is used for the preform forming operation, an intermediate forming operation and the final forming operation.

The present inventors consider that factors essential for the successful manufacture of a press lens which, after completion of manufacturing operations is high both in configurational accuracy and in surface smoothness that it is unnecessary to grind and polish the pressed lens, are judicious selection of the mold and of the pressing conditions. A first condition essential for the mold is that the mold should be polished to a high surface smoothness, i.e., having any surface irregularities or pits of less than 100Å and finished with a high degree of configurational accuracy. In other words, the mold is carefully finished, dimensioned and polished so as to deliver a completed lens with the desired configuration and surface smoothness. For this purpose, the material of the mold must be of a fine composition or at least highly uniform. As the mold is used at high temperature, the material also must be sufficiently robust and exhibit the requisite high temperature strength and high temperature hardness. That is, the mold should not fuse with glass at high temperatures otherwise the surface of the mold will be roughened by glass. In addition, it is desirable to use for the substance forming the lens mold a material which is capable of preventing the surface of the mold from being roughened by oxidation due to air. It is, however, generally difficult to obtain a material which is completely free from oxidation. Therefore, it is necessary to use the mold in a non-oxidizing atmosphere, such as a $N_2$, $H_2+N_2$, or $CO+N_2$ atmosphere. The mold which satisfies the above-described conditions is used in manufacturing the press lens in accordance with the method of the present invention.

This mold is much higher in accuracy and cost than a conventional mold used for forming a general external form by pressing. Accordingly, the pressing conditions should be selected so that the burden, i.e., the heat and pressure stress placed on the mold, is reduced. In order to form a pressed lens high in accuracy by the pressing procedure, the following two conditions are essential:

(1) the pressing operation is concluded with the temperature of the glass substantially equal to the temperature of the mold, so that any difference in temperature between the surface and the inside of the glass is eliminated or substantially completely eliminated. This prevents the occurrence of the shrink phenomenon.

(2) after the pressing operation is ended, i.e., when the glass is relieved from pressure, the glass has been sufficiently solidified such that it will not be deformed by gravity.

In order to meet these two conditions, a piece of glass having a high viscosity of about $10^9$ to about $10^{11}$ should be pressed by high pressure because with such a high viscosity it is necessary to use high pressure to deform the glass. However, in view of the effective maximum strength tolerance of the mold, it is desirable that the pressure applied is not higher than about 1000 kg/cm$^2$. If the viscosity of glass exceeds $10^{11}$ poises, it is substantially impossible to deform the glass by viscous flow; the operating viscosity is the range in which viscoelastic deformation occurs.

The fundamental conditions for forming a pressed lens having a high degree of dimensional accuracy are as described above. However, even if a high pressure press is employed, it is impossible to deform a piece glass having a high viscosity of $10^9$ to $10^{10}$ more than several microns to 100 microns in a limited period of time. For instance, in the case where a flat disk-shaped glass plate is formed into a spherical lens by pressing, the degree of deformation is much more than that described above. In a conventional press lens forming method, a piece of glass having a low viscosity at extremely high temperatures is pressed by a relatively low pressure, i.e., 2 to 10 kg/cm$^2$, into a predetermined form. However, in this conventional method, the piece of glass thus treated shrinks after cooling, and as the piece of glass at high temperature is put in the mold, the surface of the mold is liable to be roughened.

The present inventors have found that if a piece of glass at a relatively low temperature, i.e., a piece of glass whose inside viscosity is $10^6$ to $10^{8.5}$ poises, is put in a mold held at a temperature higher than the glass transition temperature and is pressed by a high pressure of 100 kg/cm$^2$ or higher, the piece of glass is sufficiently deformed to have a predetermined form and the pressing operation can be completed in a relatively short time.

Briefly stated, the present invention is characterized by a press lens forming method in which a piece of glass whose inside viscosity is $10^6$ to $10^{8.5}$ poises is put in a mold at a temperature higher than the glass transition temperature and is pressed by a pressure of 100 kg/cm$^2$ or higher, the pressing operation being completed when the viscosity of the glass reaches $10^9$ to $10^{11}$ poises. When the pressing operation is completed, the temperature of the mold is substantially equal to that of the glass, and the temperature of the surface of the pressed glass product is substantially equal to that of the inside thereof.

The present invention also proposes a multi-step pressing method in order to improve productivity. As described above, generally stated the press for forming pressed lenses is used to perform two functions. In its first function, a piece of glass is relatively greatly deformed to give it a general external approximating that of the finished article form. In the second function, the configurational accuracy of the product is increased. Accordingly, the pressing operation can be performed in two or three steps, according to the functions of the process. In this case, for instance, two or three metal molds are set on a turntable, and a piece of glass supported by a ring-shaped mold is positioned into the molds and pressed successively. If this operation is carried out continuously, then the time required for pressing the piece of glass with each mold is reduced, thereby improving productivity.

In the case where a piece of glass a processed to have a general external form is used, i.e., a disk-shaped glass formed by punching a plate of glass or by cutting a round bar, or a piece of glass which is obtained by cooling a gob of glass formed according to a conventional method and by removing shearing marks therefrom is used, a preform forming operation is carried out in which, for instance, the piece of glass is supported by a ring-shaped mold, and heated and softened, e.g., by a laser beam, such that the viscosity of the inside of the glass becomes $10^6$ to $10^{7.8}$ poises. Next the piece of glass, together with the ring-shaped mold, is put into a preform-forming mold where it is formed into a preform. In this operation, sand marks are removed from the piece of glass, and therefore the piece of glass may be one which is sand-ground. In succession, the piece of glass thus treated, together with the ring-shaped mold, is conveyed, so that in intermediate forming operation is carried out when the glass inside viscosity is $10^{7.5}$ to $10^9$ poises, to a final forming operation which is carried out when the inside glass viscosity is $10^{7.5}$ or $10^{8.5}$ to $10^{11}$ poises. This prevents occurrence of the shrink phenomenon, and the optical mirror surfaces of the mold are transferred to the piece of glass. It is preferable that prior to these steps the surface of the piece of glass is substantially heated to a temperature higher than that of the inside of the piece of glass. In each step, the temperature of the mold is set to a temperature higher than the glass transition temperature, but in the finial forming operation it is adjusted to a temperature substantially equal to or slightly lower than the temperature of the glass. Even if the intermediate forming operation or the final forming operation is eliminated, a press lens can be manufactured with high efficiency.

Use of the multi-step pressing method provides not only the desirable result that the productivity is improved, but also the advantage that an expensive mold which is high in surface accuracy and surface smoothness is used only in the final forming operation. In the final forming operation, the glass temperature is decreased, and the mold is in contact with the glass for only a short time. Accordingly, the service life of the mold is increased, and therefore the general manufacturing cost is greatly reduced.

Another embodiment of the process is a modification of the multi-step pressing method, in which a preform is used which is obtained by pressing a gob of glass in a conventional manner (with a glass viscosity of 10 to $10^3$ and a pressing pressure of 2 to 10 kg/cm$^2$) to provide an external form generally similar to the desired final external form and similarly as in the abovedescribed case the intermediate forming operation and the final forming operation are carried out. In this case, the gob of glass thus formed should have no shearing marks. In general, in the conventional method of forming a lens by pressing, the temperature of the mold used is low, and therefore the product is liable to have a tree pattern. However, the tree pattern can be eliminated by the intermediate forming operation. Thus, the pressing operation can be carried out with high accuracy in succession with the glass melting operation.

The method of the present invention will now be further described with reference to the following working examples which are illustrative.

DETAILED DESCRIPTION OF THE DRAWINGS

Figure 2:
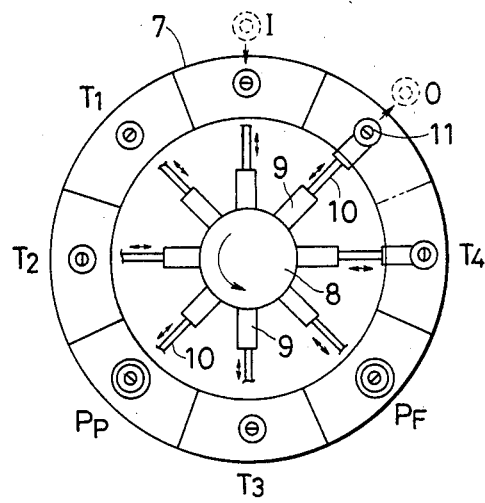
FIGS. 2 and 3 are plan views outlining the arrangement of molds on turn tables.
Figure 3:
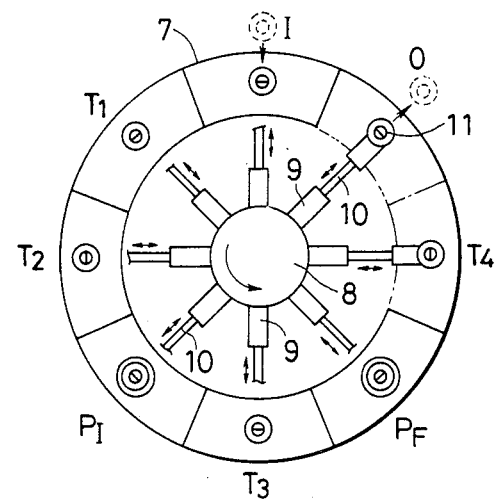

FIG. 1 is a sectional view of a mold used for a preform forming operation, an intermediate forming operation, or a final forming operation. FIG. 2 is a plan view outlining the arrangement of molds, etc. on a turntable in Example 1 of this invention. FIG. 3 is a plan view outlining the arrangement of molds, etc. on a turntable in Example 2 of the invention. In FIG. 1, 1 is the upper mold, 2 is the ring-shaped mold, 2' is the holding part of the mold, 2, 3 are the lower molds, 4 is the sleeve, 5 is the inlet/outlet, 6 is the preform or gob. In FIGS. 2 and 3 the various positions represented are I is the glass supplying position, $P_P$ is the preform forming mold position, $P_I$ is the intermediate forming mold position, $P_F$ is the final forming mold position, $T_1$, $T_2$, $T_3$ and $T_4$ are the heating positions, O is the take-out position.

EXAMPLE 1

This example described a method of pressing. A dense flint glass group optical glass SF11 was used. A gob of optical glass SF11 was formed by the conventional molding method, as described above. After cooling, the gob thus formed was polished to remove shearing marks. The resulting gob was employed as a preform. The final configuration of the lens was in the form of a meniscus 12 mm in diameter and 5 mm in central thickness.

A metal mold made of tungsten carbide and coated with TiN was employed. The mold, as shown in FIG. 1, comprises the upper mold 1, a ring-shaped mold 2, the lower mold 3, a sleeve 4, and an inlet-outlet 5 for the glass and the ringshaped barrel. A preform 6, preheated to a temperature higher than the glass transition temperature, was placed on the ring-shaped mold 2 which was preheated in the same manner. Under these conditions a 850° C. heating unit arranged adjacent to the mold was used to heat the preform for about eighteen (18) seconds until the viscosity of the inside of the preform reached $10^{6.5}$ poises. The preform was inserted into the sleeve 4 of the mold through the inlet/outlet 5 while being supported by the ring-shaped mold. The preform was pressed by moving the upper and lower molds along the sleeve. In this operation, the temperature of the mold was 473° C., the pressing pressure was 200 kg/cm², and the pressing time was 18 seconds. After annealing, the surface accuracy of the lens was within two Newton rings, and within a half line in astigmatic difference. Thus, the lens was accurate enough to be used as a photographic lens.

EXAMPLE 2

In this example a piece of glass obtained by cutting a plate of glass was used and a multistep pressing method was employed. The dense flint glass group optical glass SF11 was used. The final configuration of the lens formed was such that the diameter was 12 mm and the central thickness was 1 mm; both surfaces were concave. A preform-forming mold and a final forming mold made of tungsten carbide and coated with TiN were employed. Each of the molds, as shown in FIG. 1, comprises the upper mold 1, a ring-shaped mold 2, the lower mold 3, a sleeve 4, and an inlet/outlet 5 for the glass and the ring-shaped mold.

In FIG. 2, reference numeral 7 designates a table which is divided into eight equal sections which are radially arranged. The above-described mold assemblies are installed at the centers of the sections $P_P$ (press preforming) and $P_F$ (press final), respectively. Further in FIG. 2, reference numeral 8 designates a cylinder assembly in which eight piston cylinders 9 are radially arranged. The cylinder assembly 8 is turned in a stepping manner to stop at each section or position. Each cylinder 9 has a piston 10 with a ring-shaped mold holding member 11. At the position I, the piece of glass is placed on the holding part 2' of the ring-shaped mold 2. The piece of glass together with the ring-shaped mold 2 is moved to the heating positions $T_1$ and $T_2$ so that the glass is softened by heat. Then, at position $P_P$, the glass and the ring-shaped mold 2 are moved into the sleeve 4 of the preform forming mold through the inlet/outlet 5. Under this condition, the upper and lower molds are moved along the sleeve, to press the glass on the ring-shaped mold 2. As the upper and lower molds are accurately guided by the sleeve, the mold can be centered with a high degree accuracy. The preform thus formed is moved to the third heating position $T_3$ together with the ring-shaped mold, where it is heated so that it is uniform in temperature. Thereafter, at the position $P_F$, the preform is subjected to final forming in the mold in the same manner as that described above. The glass thus treated is cooled at the position $T_4$. Then, at the position O, the pressed lens is removed from the ring-shaped mold, and is then sent to the following station where it is gradually cooled. The lens forming conditions by pressing in the example 2 are as listed in the following Table 1:

TABLE 1

|  | Glass inside temperature | Viscosity of the same | Mold temperature | Pressing pressure | Pressing time |
| --- | --- | --- | --- | --- | --- |
| Preform forming | 590° C. | $10^7$ poises | 478° C. | 200 Kg/cm² | 10 sec |
| Final forming | 469° C. | $10^7$ poises | 469° C. | 380 Kg/cm² | 10 sec |

The surface accuracy of the lens thus formed was within two Newton rings and within a half line in astigmatic difference. Thus, the lens was sufficiently high in accuracy. In the example, the lens was thin, and therefore it was unnecessary to perform the intermediate forming operation. However, if a lens to be formed is relatively large in thickness, it is preferable that the intermediate forming operation is carried out between the preform forming operation and the final forming operation.

EXAMPLE 3

In the example, a coarse forming operation (a conventional operation of roughly forming an external form by pressing) was first carried out. Phosphate glass, having a glass transition temperature 420° C., $n_d$ 1,600 and $v_d$ 63.5, was used. The final configuration of the lens was such that the diameter was 30 mm and the central thickness was 4 mm and that both surfaces were convex.

In the coarse forming operation, a mold of cast iron was used. The coarse forming operation was carried with a lower mold movement type turntable in the conventional manner.

An intermediate and final forming turntable as shown in FIG. 3 was set next to the coarse forming turn table. In FIG. 3, at position I the coarse product is put in the ringshaped mold by a vacuum chuck so that it is supported by the holding part 2' of the ring-shaped mold 2. Under this condition, the coarse product is moved successively heating positions $T_1$ and $T_2$, where it is heated. Thereafter, at the position $P_I$ the coarse product together with the ring-shaped mold is inserted into the sleeve 4 of the intermediate forming mold through the inlet/outlet 5, so that it is pressed. Then, at the position $T_3$, the product is made uniform in temperature. At position $P_F$, the final forming operation is carried out. The lens forming conditions by pressing in the example are listed below:

TABLE 2

| | Glass inside temperature | Viscosity Viscosity of the same | Mold Temperature | Pressing pressure | Pressing time |
|---|---|---|---|---|---|
| Coarse forming | 810° C. | 20 poises | 370° C. | 3 kg/cm² | 5 sec |
| Intermediate forming | 490° C. | $10^{7.5}$ poises | 448° C. | 150 kg/cm² | 15 sec |
| Final forming | 448° C. | $10^{10.5}$ poises | 448° C. | 380 kg/cm² | 15 sec |

The surface accuracy of the glass lens thus formed was within four Newton rings and within one line in astigmatic difference. Thus, the lens was sufficiently high in accuracy.

According to the present invention, a high precision press lens which needs no grinding and polishing after being formed by pressing can be manufactured in a relatively short period of time, and furthermore the glass temperature is relatively low and the pressing time short. Accordingly, the service lives of the expensive molds which have been polished with high accuracy can be increased. As a result, the manufacturing cost can be made much lower than that which is required when the conventional lens manufacturing method is employed.

What is claimed is:

1. A method of molding an optical lens comprising
   (a) heating a piece of glass until the heated glass has an inside viscosity within the range of $10^6$ to $10^{7.8}$ poises;
   (b) placing the glass into a mold having at least one optical quality surface while maintaining the mold at a temperature at least equal to the glass transition temperature;
   (c) preform forming the glass in the mold to give the glass an external form generally equal to the final form desired by pressing the glass while the inside viscosity of the glass is in the range of $10^{7.5}$ to $10^9$ poises; and
   (d) pressing and molding the glass into the predetermined lens configuration at a pressure of at least 100 kg/cm² while maintaining the inside viscosity of the glass between $10^{7.5}$ and $10^{11}$ poises.

* * * * *